US008188699B2

(12) United States Patent
Tategami et al.

(10) Patent No.: US 8,188,699 B2
(45) Date of Patent: May 29, 2012

(54) MOTOR CHARACTERISTICS ACQUIRING APPARATUS, CONTROL APPARATUS USING THE ACQUIRED MOTOR CHARACTERISTICS, AND POWER WINDOW CONTROL APPARATUS

(75) Inventors: Toru Tategami, Chiba (JP); Shumpei Fujii, Chiba (JP)

(73) Assignee: Mabuchi Motor Co. Ltd., Chiba (JP)

( * ) Notice: Subject to any disclaimer, the term of this patent is extended or adjusted under 35 U.S.C. 154(b) by 729 days.

(21) Appl. No.: 12/338,562

(22) Filed: Dec. 18, 2008

(65) Prior Publication Data

US 2009/0162038 A1 Jun. 25, 2009

(30) Foreign Application Priority Data

Dec. 19, 2007 (JP) ................................ 2007-326814

(51) Int. Cl.
*G05B 19/29* (2006.01)

(52) U.S. Cl. ........ 318/600; 318/603; 318/652; 318/653; 318/400.13

(58) Field of Classification Search .................. 318/600, 318/603, 618, 621, 652, 653, 400.12, 400.13, 318/400.14; 388/800, 801, 809
See application file for complete search history.

(56) References Cited

U.S. PATENT DOCUMENTS

| | | | | |
|---|---|---|---|---|
| 3,978,521 | A * | 8/1976 | Langer et al. | 386/287 |
| 4,216,419 | A * | 8/1980 | van Dam et al. | 388/813 |
| 4,870,333 | A * | 9/1989 | Itoh et al. | 318/286 |
| 5,627,697 | A * | 5/1997 | Eisenberg et al. | 360/73.14 |
| 6,118,244 | A * | 9/2000 | Steinbusch | 318/603 |
| 7,541,759 | B2 * | 6/2009 | Hirai | 318/286 |
| 7,928,674 | B2 * | 4/2011 | Sako et al. | 318/268 |

FOREIGN PATENT DOCUMENTS

| | | |
|---|---|---|
| JP | 1992096064 U | 8/1992 |
| JP | 11107624 | 4/1999 |

OTHER PUBLICATIONS

Notification of Reason(s) for Refusal in Japanese Patent Application No. 2007-326814 dated Jan. 24, 2012.

* cited by examiner

*Primary Examiner* — Walter Benson
*Assistant Examiner* — Thai Dinh
(74) *Attorney, Agent, or Firm* — Schwabe, Williamson & Wyatt

(57) ABSTRACT

The rotation period of a motor is subdivided by edge interval times and a rate of change between a currently calculated edge interval time and an edge interval time calculated one rotation of the motor previously is calculated at the detection of each edge. Then the rotation period of the motor is calculated by multiplying a set reference period by the calculated rate of change.

7 Claims, 7 Drawing Sheets

MOTOR CHARACTERISTICS ACQUIRING APPARATUS, CONTROL APPARATUS USING THE ACQUIRED MOTOR CHARACTERISTICS, AND POWER WINDOW CONTROL APPARATUS

CROSS REFERENCE TO RELATED APPLICATIONS

The present application claims international priority under 35 U.S.C. §119 to co-pending Japanese Patent Application No. 2007-326814 filed 19 Dec. 2007, entitled "MOTOR CHARACTERISTICS ACQUIRING APPARATUS, CONTROL APPARATUS USING THE ACQUIRED MOTOR CHARACTERISTICS, AND POWER WINDOW CONTROL APPARATUS," the entire content and disclosure of which is hereby incorporated by reference in its entirety.

BACKGROUND OF THE INVENTION

1. Field of the Invention

The present invention relates to an apparatus for acquiring the rotational characteristics of a motor as a drive source and a control apparatus for performing control using the acquired motor characteristics.

2. Description of the Related Art

Some motor vehicles have automatic windows called "power windows", which are so designed that when some foreign object is caught in a closing door glass (window glass), the jamming is detected quickly and the door glass is rolled back in an opening direction automatically. This is done to prevent any excessive load from bearing on the caught object. Such a door glass is driven up or down by the forward or reverse rotation of a dedicated motor, and, as such, the operation speed of the door glass changes with the rotational speed of the motor. When an object is jammed during the rising of the door glass, the operation speed thereof drops due to a reaction force of the load bearing on the object. Hence, the jamming can be detected from a drop in the rotational speed of the motor below a predetermined reference value.

The rotational speed of the motor is detected by a rotation detection sensor provided on a rotating shaft of the motor. The rotation detection sensor comprises a magnet whose north pole and south pole are oppositely disposed on the rotating shaft of the motor and hall elements that are disposed therearound. As the magnet rotates together with the rotating shaft of the motor, pulsing detection signals (hall voltages) proportional to the magnetic flux density are outputted from the hall elements. The rotational speed of the motor can be determined by calculating the rotation period of the motor from the pulse width of the detection signals. In such an arrangement, if two hall elements are disposed out of phase from each other relative to a single magnet for instance, then the rotational direction of the motor can also be detected by comparing the on and off states of the detection signals outputted from the two hall elements.

A problem with such a rotation detection sensor as described above, however, is that variation, if any, in the polarization of the north and south poles of the magnet can cause errors in the pulse width of the detection signals, which renders accurate determination of the rotational speed of the motor difficult. Moreover, provision of a plurality of hall elements can cause installation errors of the hall elements also.

To solve these problems, methods have been proposed in which a threshold value is set for detection signals outputted from the hall elements and the rotational speed of the motor is calculated from the elapsed time between the corresponding edges of the detected rectangular pulse signals (See Reference (1) in the following Related Art List, for instance)

The setting of a threshold value as described above so as to use a detection point on the edges of signals as reference enables calculation of the rotation period of the motor constantly with reference to the same point of the magnet. As a result, the effects of errors in polarization and/or installation of the hall elements can be practically eliminated. Furthermore, provision of a plurality of hall elements allows the calculation of the rotation period at every detection of the rising and falling edges of each pulse signal. And this leads to improved measuring accuracy because of shorter calculation interval of the rotational speed of the motor, for example by acquiring the rotation period at every ¼ cycle.

RELATED ART LIST (1) Japanese Patent Application Publication No. 11-107624.

In the case of the method described in Japanese Patent Application Publication No. 11-107624, however, the elapsed time from a rising edge to the next rising edge and that from a falling edge to the next falling edge of pulse signals of individual hall elements are calculated as rotation periods. That is, each edge interval to be calculated covers one whole cycle, and this presents a problem that a sudden change of rotation period, if it occurs during a single rotation of the motor, makes quick response to the change difficult. Thus, despite the improved resolution in terms of calculation period, there still remain temporally overlapping portions in the calculating interval of each pulse signal. Accordingly, a resulting problem is that even when there occurs a local change in rotation period (i.e., the rotational speed of the motor) during a time period of each rotation period, the change cannot be accurately reflected in the rotation period calculation.

In the application of such a rotation detection sensor to the power window, the rotational speed of the motor can change suddenly especially when a hard object is caught in the closing window. In order to prevent any excessive load from working at the jamming of a hard object, therefore, it is necessary that the momentarily changing rotation period of the motor be detected with high accuracy and sensitivity. It is to be noted that this necessity exists not only for the power window but also for a sliding roof, an automatic door or shutter, and other equipment that are driven by a motor while the motor speed is detected by a rotation detection sensor to realize the control of their drive.

SUMMARY OF THE INVENTION

The present invention has been made in view of the foregoing problems, and a general purpose thereof is to provide an apparatus that responds to changes in the rotation period of a motor with high sensitivity while eliminating errors in polarization of magnet and installation of rotation detection sensors.

In order to resolve the above-described problems, one embodiment of the present invention provides a motor characteristics acquiring apparatus for acquiring motor characteristics which comprises: a magnet fixed to a rotating shaft of a motor; at least one magnetic sensor, disposed around a periphery of the rotating shaft, which outputs a signal when the magnet passes nearby with a rotation of the motor; and an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared.

Here, a single "magnetic sensor" or a plurality of them may be provided around the rotating shaft of the motor. In the latter case, a plurality of magnetic sensors are disposed at predetermined intervals in a circumferential direction of the rotating shaft of the motor. When the magnet passes nearby, the magnetic sensors outputs their respective signals. The arithmetic unit may calculate the rotation period of the motor by multiplying a predetermined reference period by the calculated rate of change. The arithmetic unit may further calculate the rotational speed of the motor from the calculated rotation period. If the motor characteristics acquiring apparatus as described above is included in a control apparatus that controls an object to be controlled with a motor characteristic as a parameter, the arithmetic unit may output information on the rate of change in rotation period to a control unit of the control apparatus without the trouble of calculating the rotation period. That is, the rotation period of the motor may be calculated in such a manner that the control unit stores a reference period and multiplies the rate of change acquired from the arithmetic unit by this reference period. Further, the control unit may calculate the rotational speed of the motor from the rotation period and use this calculated rotational speed thereof in the control.

By employing this embodiment, the rotation period of the motor is subdivided by the edge interval times and the rate of change between the currently calculated edge interval time and the edge interval time corresponding to that calculated at least one rotation of the motor previously is calculated at each edge detection. Since this rate of change represents a rate of elapsed time of the same phase intervals where the rotation phase of the motor is the same, it reflects the rate of change in the rotation period of the motor in said phase interval. As a result, by multiplying this rate of change by the rotation period obtained before a change, the rotation period of the motor can be accurately calculated irrespective of the polarization errors of the magnet and installation errors of the magnetic sensors. Also, calculating the rotation period from the rate of change in each phase interval eliminates the insensitivity of computation as in the cases where the other phase intervals are included in the calculation.

Optional combinations of the aforementioned constituting elements, and implementations of the invention in the form of methods, apparatuses, systems, and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which.

DETAILED DESCRIPTION OF THE INVENTION

Figure 1:
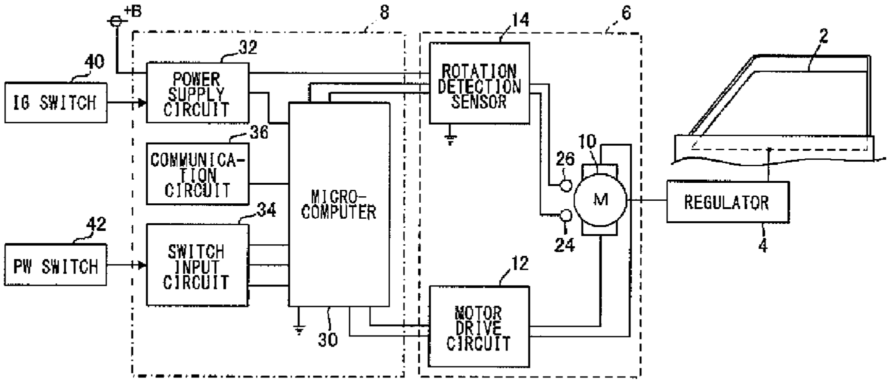
FIG. 1 illustrates schematically a structure of a power window control apparatus according to a first exemplary embodiment of the present invention.

The invention will now be described by reference to the preferred embodiments. This does not intend to limit the scope of the present invention, but to exemplify the invention.

An embodiment of the present invention is configured as a motor characteristics acquiring apparatus for the acquisition of motor characteristics. This motor characteristics acquiring apparatus comprises: a magnet fixed to a rotating shaft of a motor; at least one magnetic sensor, disposed around a periphery of the rotating shaft, which outputs a signal when the magnet passes nearby with a rotation of the motor; and an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared. The magnetic sensor may be a plurality of sensors disposed at predetermined intervals in a circumferential direction of the rotating shaft of the motor. Such an arrangement allows the detection of the rotational direction of the motor by comparing the states of a plurality of signals outputted from the respective magnetic sensors.

The arithmetic unit may calculate the rotation period of the motor by multiplying a reference period by the rate of change of a successively calculated edge interval time and that of the identical phase interval that have been calculated one rotation of the motor previously. In this way, the results of calculation may respond, with high sensitivity, to the change in rotation period in each phase interval of one cycle.

Alternatively, the arithmetic unit may store the edge interval time for every phase interval successively and calculate an average edge interval time, which is an average value of edge interval times for the identical phase interval during a predetermined time period, at each edge detection. Then the arithmetic unit may calculate the rotation period of the motor in such a manner that the rate of changes between the edge interval time calculated at the edge detection and an average edge interval is calculated and the calculated rate of change is multiplied by the reference period. The average edge interval time like this reflects the average value of rotation period for each phase interval, so that a tentative average rotation period of the motor can be obtained by adding up the average edge interval times of all the phase intervals of one cycle. This tentative rotation period may be understood to reflect the operation characteristics of the motor at normal times. Hence, the arrangement may be such that the rotation period is calculated by multiplying this tentative rotation period by the above-described rate of change.

It should also be noted that the rotating torque right after the start of motor run is relatively large and therefore it may take a certain number of revolutions before stable rotation characteristics can be obtained. Moreover, it is normally not possible to calculate a rotation period until the motor makes at least one revolution. However, if the rotational speed of the motor must be detected during such a period, then it will be necessary to determine the rotation period right after the start of motor run in some way or other. In such a case, the arithmetic unit may calculate a tentative rotation period based on an elapsed time, which is the sum total of edge interval times obtained after the start of motor run at each edge detection during a predetermined time period from the start of motor run, and the number of edges detected during the elapsed time. This tentative rotation period, which is calculated at every edge detection, may be held in storage for each phase interval. And the arithmetic unit may calculate the rotation period in such a manner that a tentative rotation period corresponding to each phase interval detected finally during the predetermined time period is used as a tentative reference period at the time of initial edge detection corresponding to each phase interval after the lapse of the predetermined time period. At each edge detection after the predetermined time period, the arithmetic unit may calculate the rotation period of the motor using the rotation period previously calculated for the same phase interval as the reference period.

Further alternatively, the arithmetic unit may refrain from calculation of the rotation period by taking a predetermined time period after the start of motor run as a data acquisition duration for calculating a reference period, and calculate a tentative reference period based on the elapsed time of the predetermined time period and the number of edges detected during the elapsed time. Then, at the time of each initial edge detection after the lapse of the predetermined time period, the arithmetic unit may calculate the rotation period of the motor using the tentative reference period. And at each edge detection thereafter, the arithmetic unit may calculate the rotation period of the motor using the rotation period previously calculated for the same phase interval as the reference period.

According to the embodiments described above, the rotation period calculated for each phase interval is used as a reference period in the calculation of the rotation period for the next same phase interval. It should be noted, however, that the rotation period changes moment by moment with the rotation of the motor. Hence, the arithmetic unit may reset the acquired information on the rotation period at the stop of motor run and start calculating the rotation period at every start of motor run.

Also, in the calculation by relative comparison using the previous rotation period as the reference period as described above, there may be cases where an error occurs between the rotation period thus calculated and the actual rotation period and such errors accumulate. To solve such a problem, the reference periods calculated successively may be controlled by the use of absolute values. That is, the arithmetic unit may refer to an acceptable calculation range preset for the rotation period, and when a calculated rotation period falls out of the acceptable calculation range, the arithmetic unit may calculate a tentative reference period again without using the rotation period as the next reference period and then calculate the rotation period of the motor using the thus obtained tentative reference period. The "acceptable calculation range" may be a range of rotation period that can be assumed from the design specifications of the motor for instance or may be a possible range at normal times that is determined by characteristics tests on the motor or the like. Or the arrangement may be such that the reference period is reset and recalculated at the end of every predetermined time period when the rotation period has fallen out of the acceptable calculation range as mentioned above or even irrespective of the acceptable calculation range.

The motor characteristics acquiring apparatus as described above may be incorporated as a motor characteristics acquiring unit into a control apparatus that controls an object to be controlled with a motor characteristic such as the rotational speed of the motor as a parameter. For example, it may be incorporated into a control apparatus for the power window, the sliding roof, the automatic door or shutter, or the like that is driven by a motor while the motor speed is detected by a rotation detection sensor to realize the control of the drive. The control apparatus may carry out the motor speed control by calculating the rotational speed thereof from the rotation period of the motor acquired by the motor characteristics acquiring unit and then shifting to a preset control mode according to the rotational speed.

The invention is now described in detail using concrete exemplary embodiments. The following exemplary embodiments are reductions to practice where the motor characteristics acquiring apparatus according to the present invention is incorporated into a power window control apparatus.

First Exemplary Embodiment

Figure 2:
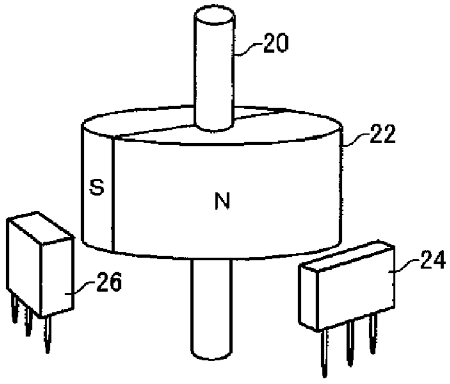
FIG. 2 illustrates schematically a structure of a rotation detector for a motor that drives a power window.

FIG. 1 shows a schematic constitution of a power window control apparatus according to a first exemplary embodiment of the present invention. FIG. 2 illustrates schematically a structure of a rotation detector for a motor that drives a power window. For convenience of explanation, a power window control apparatus as shown in FIG. 1 is to be understood as one installed in a position operable from the driver's seat.

As shown in FIG. 1, the power window control apparatus according to the first exemplary embodiment drives and controls a regulator 4 for operating a door glass 2 of a vehicle up and down. The power window control apparatus includes a motor actuator 6 for driving the regulator 4 and a control unit 8 for driving the motor actuator 6.

The motor actuator 6 includes a motor 10 for driving the regulator 4, a motor drive circuit 12 for driving the motor 10, and a rotation detection sensor 14 for detecting the rotation status of the motor 10. The motor 10, whose rotating shaft is coupled to a not-shown arm of the regulator 4 through a speed-reduction gear, rotates in the normal direction to extend an arm, thereby moving the door glass 2 in the closing direction, and rotates in the reverse direction to contract the arm, thereby moving the door glass 2 in the opening direction.

The motor drive circuit 12 includes a plurality of relay circuits performing on/off action according to command signals from the control unit 8. Each relay circuit has a transistor, and each relay is switched on or off by turning on or off the current to the transistor. In this manner, the voltage is applied to the motor 10 for normal rotation or reverse rotation.

The rotation detection sensor 14 outputs a pulse signal according to the rotation of the motor 10 to the control unit 8. As shown in FIG. 2, a bipolar magnet 22 having the north pole and south pole oppositely disposed to each other is fixed on a rotating shaft 20 of the motor 10. In this exemplary embodiment, the north pole and the south pole are disposed symmetrically to each other with respect to the rotating shaft 20, so that the boundary therebetween appears every 180 degrees or so in rotation phase. Here, the rotation phase is an angle of rotation (expressed in degrees) relative to a reference point. The rotation detection sensor 14 is constituted by including two hall elements 24 and 26 as magnetic sensors which are disposed around the magnet 22. The hall element 24 and the hall element 26 are located 90 degrees apart from each other with the rotating shaft 20 as the center. As the magnet 22 rotates together with the rotating shaft 20 of the motor 10, each of the hall elements outputs pulsing detection signals (hall voltages) proportional to the magnetic flux density produced by the magnet 22.

Referring back to FIG. 1, the control unit 8 includes a microcomputer 30 as the central component, a power supply circuit 32, a switch input circuit 34, and a communication circuit 36. The power supply circuit 32 supplies the power-supply voltage of a not-shown battery to such units as the microcomputer 30 and the hall elements of the rotation detection sensor 14. Also, input signals from an ignition switch (hereinafter referred to as "IG switch") 40 are inputted to the microcomputer 30 by way of the power supply circuit 32.

The microcomputer 30 includes a CPU for performing various arithmetic processings, a ROM for storing various control programs, a RAM used for data storage and as a work area for executing programs, an I/O interface, and a timer for timekeeping.

The switch input circuit 34 inputs input signals according to the operation of a power window switch (hereinafter referred to as "PW switch") 42 by a driver to the microcomputer 30. The switch input circuit 34 includes a manual switch and an auto switch. The manual switch includes an opening switch and a closing switch. The opening switch, which is turned on when the driver pushes the PW switch 42 one step down, outputs a signal for moving the door glass 2 in the opening direction only during a push-down operation. The closing switch, which is turned on when the driver pulls up the PW switch 42 one step up, outputs a signal for moving the door glass 2 in the closing direction only during a pull-up operation. On the other hand, the auto switch turns on when the PW switch 42 is operated two steps and outputs a signal to keep moving the door glass 2 in the opening or closing direction even after the driver has stopped operating the switch.

The communication circuit 36 is a circuit for two-way communication with a not-shown electronic control unit (hereinafter referred to as "ECU") installed in a vehicle and is coupled to the ECU via a not-shown communication line. The ECU, which is connected to the control unit 8 provided in the driver's seat, a control unit provided in the passenger seat, and a control unit provided in each of the right-hand and left-hand backseats, manages these control units in a unified manner. Also provided in the driver's seat are PW switches for driving and controlling the door glasses of the passenger seat and backseats. As the driver operates these switches, the respective operation command signals are transmitted to those control units via the ECU.

The microcomputer 30 carries out predetermined arithmetic processings according to the input signals from the sensors and switches and the communication circuit 36, and outputs control signals to the motor drive circuit 12. The microcomputer 30 also communicates with the ECU whenever necessary.

Figure 3:
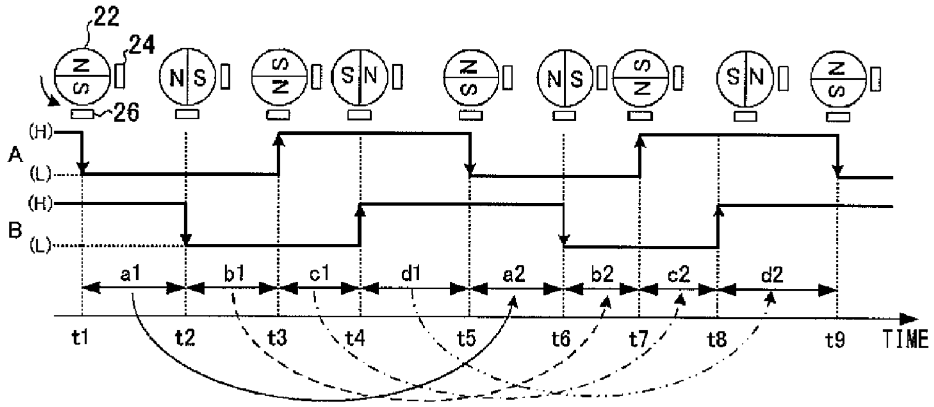
FIG. 3 is a diagram for explaining a method for calculating a rotation period of a motor.
Figure 4:
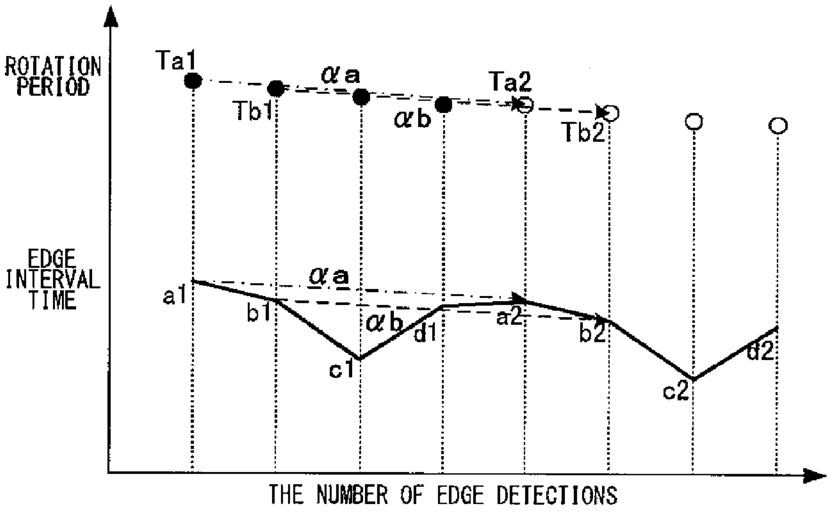
FIG. 4 is a diagram for explaining a method for calculating a rotation period of a motor.

Now a description will cover a method for detecting the rotational speed of the motor 10 according to the first exemplary embodiment. FIG. 3 and FIG. 4 are diagrams for explaining a method for calculating the rotation period of the motor. In FIG. 3, pulse signal A outputted from the hall element 24 by way of the rotation detection sensor 14 is shown on an upper level, and pulse signal B outputted from the hall element 26 by way of the rotation detection sensor 14 is shown on a lower level. The horizontal axis of FIG. 3 represents the lapse of time. Shown in FIG. 4 is a relationship between the edges of pulse signal detected in the process of computing the rotation period and the parameters used in the computation. The horizontal axis of FIG. 4 represents the number of edge detections, and the vertical axis the rotation period and the edge interval time.

As already mentioned, the hall elements 24 and 26 output pulsing detection signals proportional to the magnetic flux density given by the magnet 22. Since the rotation detection sensor 14 sets not-shown threshold values THS and THN to the output signals (hall voltages) from the hall elements, the output level of the detection signals switches between an H level and an L level when the magnetic flux density changes across the threshold values. The threshold value THS is a value of detection signal used as reference for switching the output level when the magnet 22 rotates into the south pole side from the boundary between the north pole and south pole. On the other hand, the threshold value THN is a value of detection signal used as reference for switching the output level when the magnet 22 rotates into the north pole side from the boundary between the north pole and south pole. In the first exemplary embodiment, the threshold values THS and THN are both set at zero, so that the output level switches according to the orientation of detected magnetic flux and rectangular pulse signals A and B as shown in FIG. 3 are inputted to the microcomputer 30.

That is, when the orientation of magnetic flux turns positive by a status shift of each of the hall elements from one facing the south pole of the magnet 22 to one facing the north pole, each of the pulse signals switches from the L level to the H level. Conversely, when the orientation of magnetic flux turns negative by a status shift of each of the hall elements from one facing the north pole of the magnet 22 to one facing the south pole, each of the pulse signals switches from the H level to the L level. In other words, whenever the boundary between the north pole and the south pole of the magnet 22 passes, there occurs a switching of output levels, in which a rising edge or a falling edge of an applicable pulse signal is detected by the microcomputer 30.

In the example shown in FIG. 3, a falling edge of pulse signal A from the hall element 24 is detected at time t1, and a falling edge of pulse signal B from the hall element 26 is detected at time t2. And a rising edge of pulse signal A is detected at time t3, and a rising edge of pulse signal B is detected at time t4.

In the present exemplary embodiment, edge interval times a1, b1, c1, d1, a2, . . . between edges which are detected in time sequence are first calculated successively irrespective of which of the two pulse signals those rising edges and falling edges belong to. That is, the microcomputer 30 sets off a timer at the detection of the first edge and calculates a time interval between edges using each edge as a trigger. The timer may be, for instance, a free running counter, and the edge interval time may be calculated from the difference in counted values. Note that such a counting process is known as is disclosed in Reference (1) of the Related Art List, for instance, and therefore the detailed description thereof is omitted here. The edge interval times, which correspond each to approximately ¼ of the rotation period of the motor 10, do not necessarily take the same value because the rotation period can change even during its single cycle. In reality, they must be understood to take different values on account of errors in polarization between the north pole and the south pole of the magnet 22 and errors in the installation of the hall elements. In the example shown in FIG. 3, the edge interval time c1 is shorter than the edge interval time a1.

And the momentarily changing real-time rotation period of the motor 10 is calculated by multiplying a previously calculated reference period by a rate of change α of edge interval time in the same phase interval between the previous and current cycles. For example, when a falling edge of pulse signal B is detected at time t6, the edge interval time a2 from the falling edge of pulse signal A, which precedes it, is calculated. Then the rate of change αa (=a2/a1) of this edge interval time a2 and the edge interval time a1 of the same phase interval of the previous cycle is calculated. Then, as shown in FIG. 4, the rotation period Ta2 at the current edge detection is calculated by multiplying the reference period Ta1, which has been calculated at the edge detection in the same phase interval of the previous cycle by the rate of change αa. This rotation period Ta2 is used as the reference period at the edge detection in the same phase interval of the next cycle. Note that “phase interval” as used herein means each interval or section of rotation phase sectioned by edges. Since each edge is detected at the same position of rotation phase of the rotating shaft 20 from the viewpoint of each hall element, each phase interval between edges is constant irrespective of the rotational speed of the motor 10. The “same phase interval” as used herein means an interval whose phase interval is identical to that of the others. In the example shown in FIG. 3, the phase interval of the edge interval time a1 and that of the edge interval time a2, the phase interval of the edge interval time b1 and that of the edge interval time b2, the phase interval of the edge interval time c1 and that of the edge interval time c2, and the phase interval of the edge interval time d1 and that of the edge interval time d2 are same phase intervals, respectively.

Similarly, when the edge interval time b2 is calculated at the edge detection at time t7, the rate of change αb (=b2/b1) relative to the edge interval time b1 of the same phase interval of the previous cycle is calculated. Then the rotation period Tb2 at the current edge detection is calculated by multiplying the reference period Tb1, which has been calculated at the edge detection in the same phase interval of the previous cycle, by the rate of change αb. Now the current real-time rotation period is calculated using the rotation period calculated at the edge detection corresponding to the same phase interval of the previous cycle as the reference period. During a predetermined time period until the rotation period of the previous cycle is finally decided, however, an average rotation period is calculated based on an accumulated value of edge interval times during the predetermined time period. The detail of this calculation will be discussed later.

A calculation method of rotation period as described above, which is based on the computation of change in period every ¼ cycle or so, provides a higher computational accuracy than the calculation of rotation time of every cycle as in the conventional techniques. Also, in this method, the rate of change of edge interval time in each same phase interval subdividing a cycle is calculated and the rotation period is calculated on the assumption that it also changes at the same rate of change. As a result, it is possible to respond to the change in the subdivided phase interval with greater sensitivity.

Figure 5:
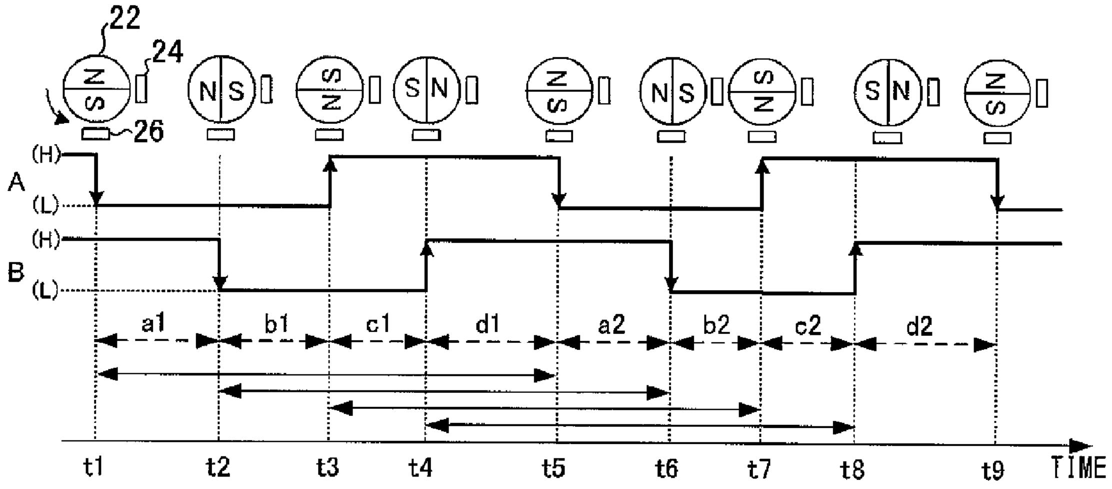
FIG. 5 is a diagram for explaining a method of calculating the rotation period of a motor on an every cycle basis, as a comparative example.

FIG. 5 is a diagram for explaining a method of calculating the rotation period of a motor on an every cycle basis. It is a comparative example in contrast to one shown in FIG. 3.

When the rotation period is calculated cycle by cycle as in the comparative example, the rotation period calculated at time t6 is Ta2=b1+c1+d1+a2. That is, while it is desired that a real-time rotation period be calculated in correspondence to the edge interval time a2 which is immediately before time t6, the accuracy of the calculation in this comparative example may be compromised by the edge interval times b1, c1 and d1 which are phase intervals different from the edge interval time a2. To solve this problem, one may consider a possibility of simply quadrupling the edge interval time a2 to obtain the rotation period because the phase interval of the edge interval time a2 is approximately ¼ cycle. However, this, too, may not assure accurate calculation because of the presence of polarization errors of the magnet 22 and installation errors of the hall elements. The present exemplary embodiment, therefore, makes use of the rate of change αa (=a2/a1) of the edge interval time a2 from the edge interval time a1 which is the same phase interval. Since comparison between the same phase intervals is free from the effects of polarization errors and installation errors, it is possible to obtain the rotation period based on the rate of change αa with high accuracy and sensitivity even when there is a sudden change in the rotational speed of the motor 10.

Figure 6:
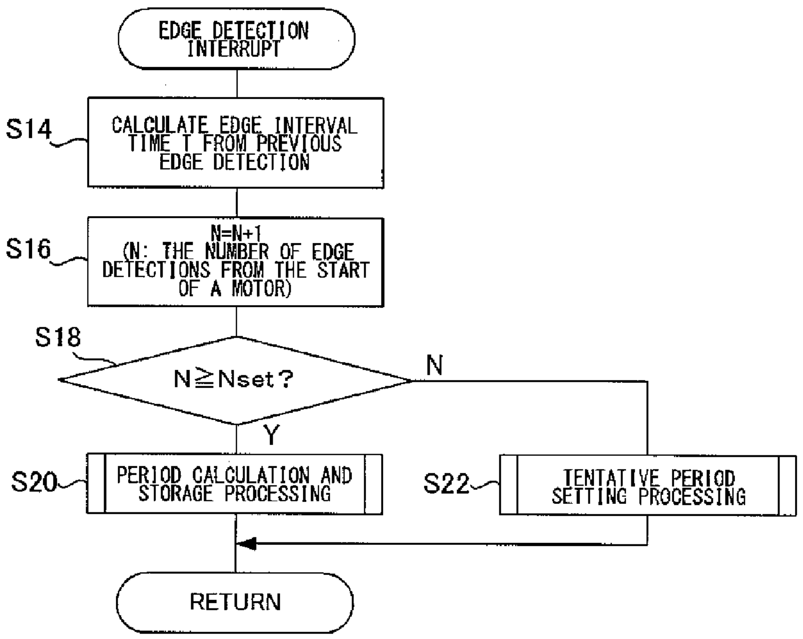
FIG. 6 is a flowchart showing a flow of rotation period calculation processings.

Next, a description will be given of a specific example of calculation of the rotation period of the motor 10. FIG. 6 is a flowchart showing a flow of rotation period calculation processings. The processings are executed by the microcomputer 30 at a predetermined interrupt timing after the IG switch 40 is turned on.

When the PW switch 42 is operated by the driver and a signal indicating a drive request for the door glass 2 is inputted from the switch input circuit 34, the microcomputer 30 executes a normal power window control in accordance with the signal. That is, when the opening switch of the manual switch is turned on, the microcomputer 30 outputs a control signal to drive the door glass 2 in the opening direction to the motor drive circuit 12. Thereupon the motor 10 runs in the normal direction to move the door glass 2 in the opening direction. When the closing switch is turned on, the microcomputer 30 outputs a control signal to drive the door glass 2 in the closing direction to the motor drive circuit 12. Thereupon the motor 10 runs in the reverse direction to move the door glass 2 in the closing direction. With the auto switch turned on, the microcomputer 30 outputs to the motor drive circuit 12 a signal to keep moving the door glass 2 in the opening or closing direction even after the driver has stopped operating the PW switch 42. In response, the motor 10 keeps driving the opening or closing of the door glass 2. Also, if the door glass operation speed drops below a reference speed before the door glass 2 gets fully closed, which may indicate a jamming of some object, then the microcomputer 30 will perform control such that the motor 10 is reversed and the door glass 2 is driven in the opening direction as an emergency measure. At this time, the arrangement may be such that the door glass 2 does not open to a fully-open position but to a predetermined position. A detailed explanation of this power window control, which can be done by a generally-known technique, is omitted here.

In this first exemplary embodiment, the drop of rotational speed of the motor 10 is detected with high sensitivity when jamming or like phenomenon is to be determined. And in parallel with this power window control, the following rotation period calculation processings are performed.

As a pulse signal is outputted from the rotation detection sensor 14, the microcomputer 30 executes an edge interrupt routine as shown in FIG. 6. In doing so, the microcomputer 30 calculates an edge interval time T, which is the elapsed time from the previous edge detection, by referring to the timer count (S14) and at the same time raises the number of edge detections N by an increment of 1 (S16). In other words, whenever a rising edge or a falling edge of pulse signals A and B is inputted from the start of the motor 10, the microcomputer 30 calculates the number of edge detections from the start and the edge interval time between the immediately preceding edges detected and stores them in predetermined storage areas of a RAM. It is to be noted, however, that at the detection of the first edge, the edge interval time is not calculated and hence there is no calculation of S14.

Following this, if the current number of edge detections N is greater than or equal to a predetermined reference number of detections Nset (Y of S18), the microcomputer 30 executes a period calculation and storage processing to be discussed later (S20). To be set as the reference number of detections Nset in advance is the number of edge detections that assures a stable reference period used as reference for the calculation of rotation period to be described later. As also shown in FIG. 3, edges are detected in the sequence of a falling edge of pulse signal A, a falling edge of pulse signal B, a rising edge of pulse signal A, a rising edge of pulse signal A, . . . , and therefore a value of 4, which is the number of edges in a cycle, or above is set as the reference number of detections Nset. In this exemplary embodiment, 32, which is the number of edges for 8 cycles, is set so that the reference period is the rotation period of normal run of the motor. That is, right after the start of motor run, the small force of inertia makes it difficult to obtain the rotation period of normal run, so that the reference period herein is set with an allowance of multiple cycles. However, it is obvious to one skilled in the art that the reference number of detections Nset may be changed as appropriate. On the other hand, if the number of edge detections N is less than the reference number of detections Nset (N of S18), the microcomputer 30 executes a tentative period setting processing to be discussed below (S22).

Figure 7:
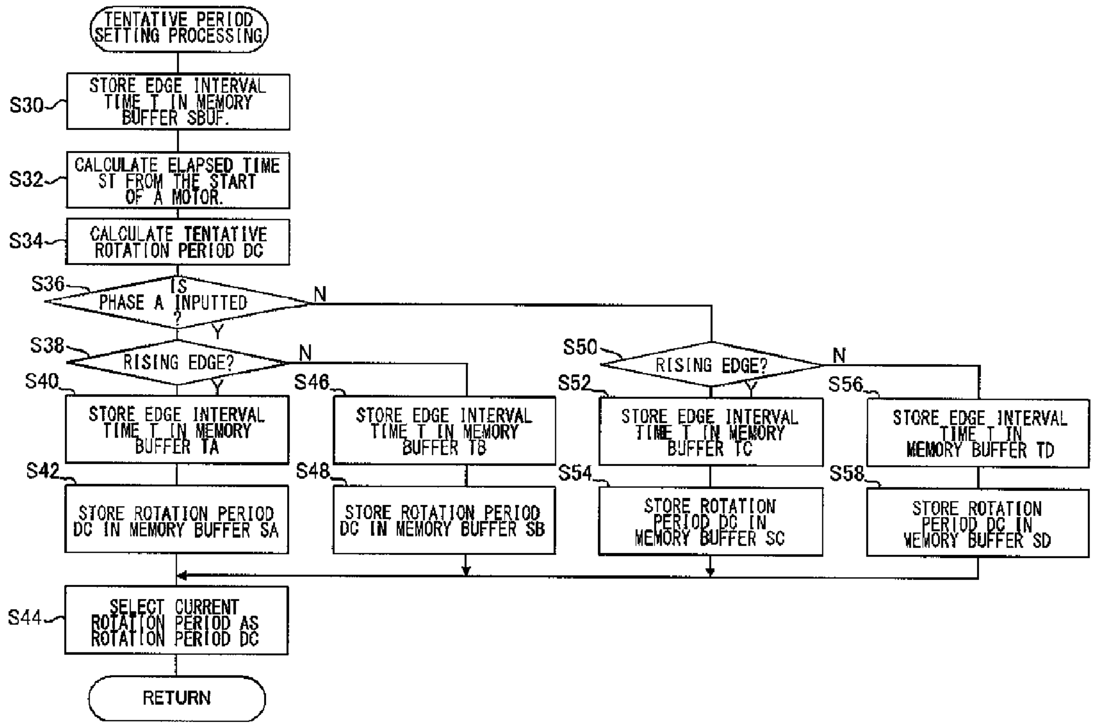
FIG. 7 is a flowchart showing a flow of a tentative period setting processing of S22 of FIG. 6.

FIG. 7 is a flowchart showing a flow of a tentative period setting processing of S22 of FIG. 6.

Until a reference period to be used in the calculation of the rotation period of the motor 10 is decided, the microcomputer 30 calculates a tentative rotation period by this tentative period setting processing and uses it in the calculation of the current rotational speed.

First, the microcomputer 30 stores the currently calculated edge interval time T in a memory buffer SBUF (S30). Then it calculates elapsed time ST from the drive start of the motor 10 by adding the currently calculated edge interval time T to the accumulated value of the previously calculated edge interval times T (S32). The microcomputer 30 calculates a tentative rotation period DC of the following Equation (1), using the elapsed time ST and the number of edges N stored in S16 (S34).

$$DC=ST\times(M/N) \tag{1}$$

where M is the number of edges detected in a single rotation of the motor 10, which is 4 in this exemplary embodiment.

Then, if the currently detected edge is a rising edge of pulse signal A (Y of S36, Y of S38), the microcomputer 30 stores the currently calculated edge interval time T in a memory buffer TA (S40), stores the rotation period DC in a memory buffer SA (S42), and selects it as the current rotation period (S44). If the edge is a falling edge of pulse signal A (Y of S36, N of S38), the microcomputer 30 stores the edge interval time T in a memory buffer TB (S46), stores the rotation period DC in a memory buffer SB (S48), and selects it as the current rotation period S (S44). If the edge is a rising edge of pulse signal B (N of S36, Y of S50), the microcomputer 30 stores the edge interval time T in a memory buffer TC (S52), stores the rotation period DC in the memory buffer SC (S54), and selects it as the current rotation period S (S44). If the edge is a falling edge of pulse signal B (N of S36, N of S50), the microcomputer 30 stores the edge interval time T in a memory buffer TD (S56), stores the rotation period DC in a memory buffer SD (S58), and selects it as the current rotation period S (S44). The rotation period S calculated as described above is used as the current rotation period in power window control until the number of edge detections N reaches the reference number of detections Nset. And when the number of edge detections N reaches the reference number of detections Nset, it becomes the reference period and is used in the original processing of S20.

Figure 8:
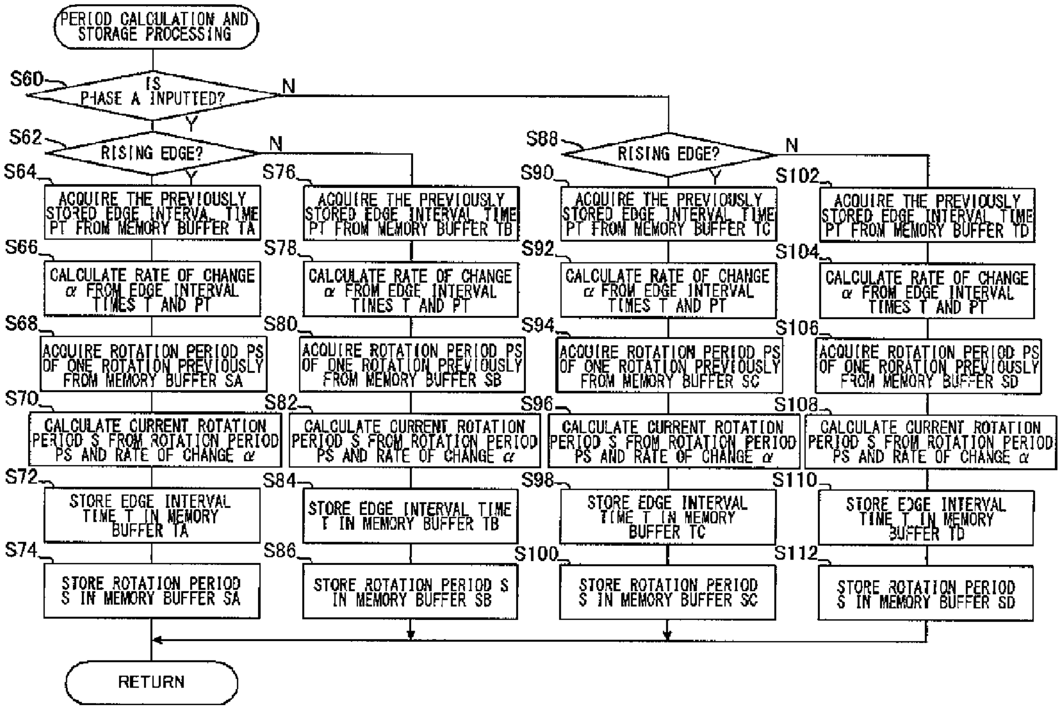
FIG. 8 is a flowchart showing a flow of period calculation and storage processing of S20 of FIG. 6.

FIG. 8 is a flowchart showing a flow of the period calculation and storage processing of S20 of FIG. 6.

In the period calculation and storage processing, if the currently detected edge is a rising edge of pulse signal A (Y of S60, Y of S62), the microcomputer 30 acquires the previously stored edge interval time PT from the memory buffer TA (S64). Then it calculates the rate of change $\alpha$ (=T/PT) from the currently detected edge interval time T and the edge interval time PT (S66). In the example shown in FIG. 4, the rate of change $\alpha$b (=b2/b1) or the like is calculated. At the same time, the microcomputer 30 acquires a rotation period PS of the motor 10 of one rotation previously, from the memory buffer SA (S68). Then, the microcomputer 30 calculates the current rotation period S from the following Equation (2) using this rotation period PS and the rate of change $\alpha$ (S70).

$$S=PS\times\alpha \tag{2}$$

Then, the microcomputer 30 stores the edge interval time T in the memory buffer TA (S72) and at the same time stores the rotation period S in the memory buffer SA (S74).

If the currently detected edge is a falling edge of pulse signal A (Y of S60, N of S62), the microcomputer 30 acquires the previously stored edge interval time PT from the memory buffer TB (S76). Then it calculates the rate of change $\alpha$ (=T/PT) from the edge interval time T and the edge interval time PT (S78). In the example shown in FIG. 4, suppose that the rate of change $\alpha$a (=a2/a1) has been calculated. At the same time, the microcomputer 30 acquires the rotation period PS of the motor 10 of one rotation previously, from the memory buffer SB (S80) and calculates the current rotation period S using the above Equation (2) (S82). Then, the microcomputer 30 stores the edge interval time T in the memory buffer TB (S84) and at the same time stores the rotation period S in the memory buffer SB (S74).

If the currently detected edge is a rising edge of pulse signal B (N of S60, Y of S88), the microcomputer 30 acquires the previously stored edge interval time PT from the memory buffer TC (S90). Then it calculate the rate of change $\alpha$ (=T/PT) from the edge interval time T and the edge interval time PT (S92). At the same time, it acquires the rotation period PS of the motor 10 of one rotation previously from the memory buffer SC (S94) and calculates the current rotation period S using the above Equation (2) (S96). Then, the microcomputer 30 stores the edge interval time T in the memory buffer TC (S98) and at the same time stores the rotation period S in the memory buffer SC (S100).

If the currently detected edge is a falling edge of pulse signal B (N of S60, N of S88), the microcomputer 30 acquires the previously stored edge interval time PT from the memory buffer TD (S102). Then it calculate the rate of change $\alpha$ (=T/PT) from the edge interval time T and the edge interval time PT (S104). At the same time, it acquires the rotation period PS of the motor 10 of one rotation previously from the memory buffer SD (S106) and calculates the current rotation period S using the above Equation (2) (S108). Then, the microcomputer 30 stores the edge interval time T in the memory buffer TD (S110) and at the same time stores the rotation period S in the memory buffer SD (S112).

As described above, in the rotation period calculation processing according to the first exemplary embodiment, a tentative rotation period is set until a predetermined length of time has elapsed and the number of edge detections N becomes greater than or equal to the reference number of detections Nset. After a stable rotation period has been obtained, this rotation period is used as the reference period for the calculation of the next rotation period.

Figure 9:
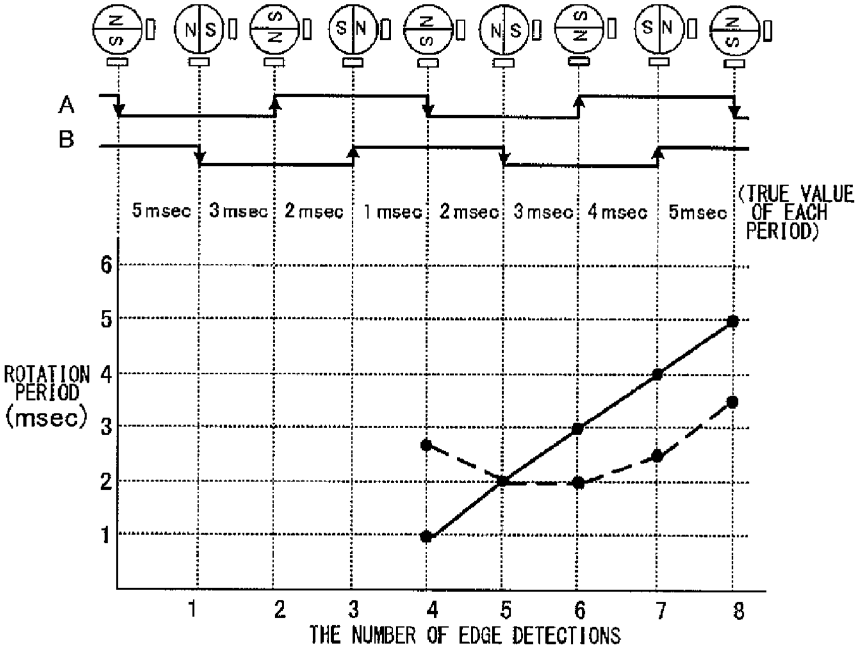
FIG. 9 is a diagram to qualitatively show advantageous effects of an exemplary embodiment.
Figure 10A:
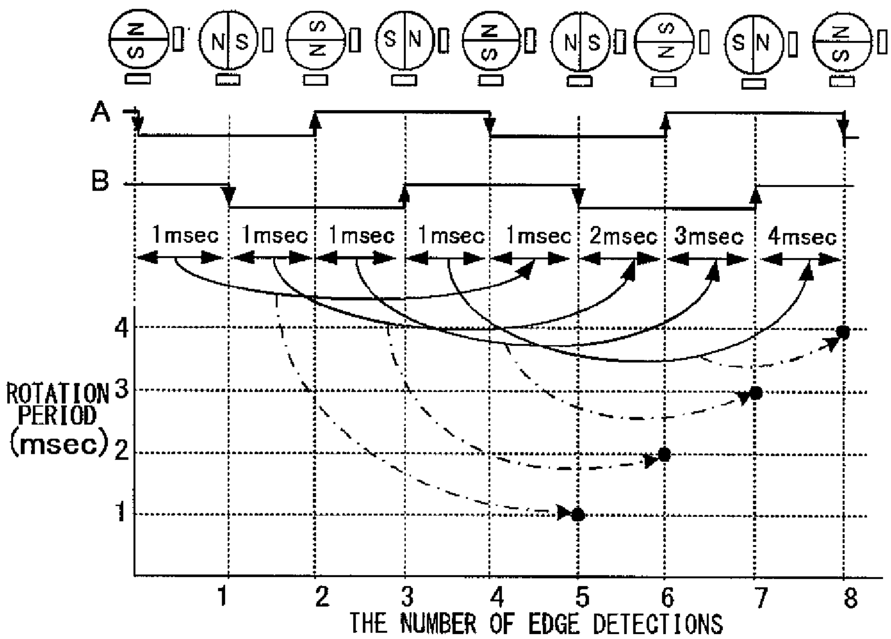
FIGS. 10A and 10B are diagrams to qualitatively show advantageous effects of an exemplary embodiment.
Figure 10B:
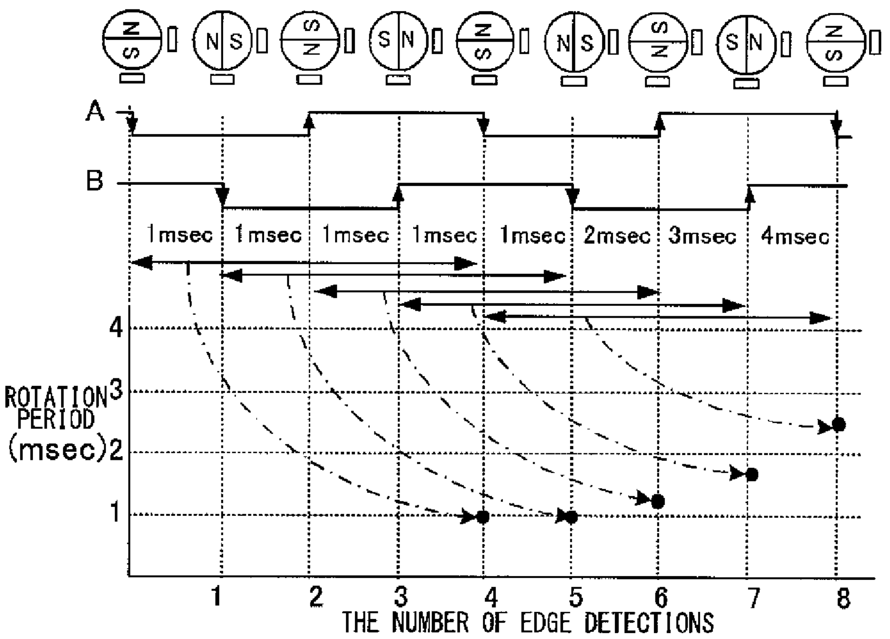

FIG. 9 and FIGS. 10A and 10B are diagrams to qualitatively show advantageous effects of the present exemplary embodiment. Assume a case where after the rotation period of the motor 10 becomes shorter gradually, the rotation period thereof becomes longer gradually again; then the change in rotation period calculated at this time is shown in FIG. 9. The horizontal axis of FIG. 9 represents the number of edge detections from a certain point in time onward, whereas the horizontal axis thereof represents the rotation period. The solid line in FIG. 9 represents a calculation method by the present exemplary embodiment (see FIG. 3), whereas the dashed line in FIG. 9 represents a result of calculation of the rotation period using the method for calculating the rotation period in the comparative example (see FIG. 5). Assume a case where the rotation period of the motor 10 becomes longer from a certain point in time until which time it has been constant, then the change in rotation period calculated at this time is shown in FIGS. 10A and 10B. FIG. 10A shows a calculation result of the rotation period in the present exemplary embodiment. FIG. 10B shows a calculation result of the rotation period in the comparative example. The horizontal axis of each of FIGS. 10A and 10B represents the number of edge detections from a certain point in time onward, whereas the horizontal axis represents the rotation period.

As shown in FIG. 9, if the rotation period of the motor 10 varies and the rotation period (true value of the period) to be obtained in the first place at the fifth detection of edge, for instance, is 2 msec, $S=5\times 2/5=2$ (msec) by the above-mentioned Equation (2) in the present exemplary embodiment and therefore the original value will be obtained. Here, the calculation is done on the assumption that the ratio of the true values of period in the corresponding edge interval times is equal to the ratio of their corresponding edge interval times. The calculation thereof from the sixth detection onward is done similarly, so that calculated values in agreement with those that should be obtained are obtained. In contrast thereto, in the comparative example, $S=(2+1+2+3)/4=2$ at the sixth detection, for example, so that values slightly different from those that should result are calculated at the subsequent detections. As shown in FIG. 10A, when the rotation period of the motor 10 varies, the calculated values varies directly in response to the change in rotation period from the fifth detection onward in the present exemplary embodiment. In contrast thereto, in the comparative example, the calculated value does not exactly follow the change in rotation period and, in fact, it lags the change in rotation period as shown in FIG. 10B.

As evident from the above, in the calculation method implemented in the comparative example, the values of rotation period at other phase intervals adversely affect the calculation of rotation period at the current edge detection. Thus the calculation values become insensitive as a whole, and such insensitive values cause problems with the accuracy of calculation results and the response to the actual rotation periods. In contrast thereto, since in the present exemplary embodiment the calculation is done using the rotation period at the current edge detection and the rotation period of the same phase interval of the previous cycle, it is found that the rotation periods of other phase intervals have no impact and therefore accurate and sensitive calculation results are obtained.

As described above, by employing the first exemplary embodiment, the rotation period of the motor 10 is subdivided by the edge interval times and the rate of change $\alpha$ between the currently calculated interval time and the edge interval time corresponding to that calculated one cycle previously is calculated at each edge detection. That is, this rate of change $\alpha$ represents a rate of elapsed time required for the rotation in the same phase intervals where the rotation phase of the motor 10 is the same. Hence the rate of change $\alpha$ in the rotation period of the motor 10 can be expressed accurately. As a result, by multiplying this rate of change $\alpha$ by the rotation period obtained before a change, the current rotation period can be accurately calculated irrespective of the polarization errors of the magnet and installation errors of the magnetic sensors. Also, calculating the rotation period from the rate of change $\alpha$ in each phase interval eliminates the insensitivity of computation as in the cases where the other phase intervals are included in the calculation. Thus, the result of calculation can be obtained which reflects the change in the rotation period of the motor 10 for a short interval of time with high sensitivity.

Second Exemplary Embodiment

A description is now given of a second exemplary embodiment of the present invention. This second exemplary embodiment differs from the first exemplary embodiment in that an average edge interval time is used in the calculation processing of calculating the rotation period of the motor 10, and the other features are basically the same as in the first exemplary embodiment. Thus, the structural components of the second exemplary embodiment similar to those of the first exemplary embodiment are given the identical reference numerals when needed and the description thereof is omitted as appropriate.

Figure 11:
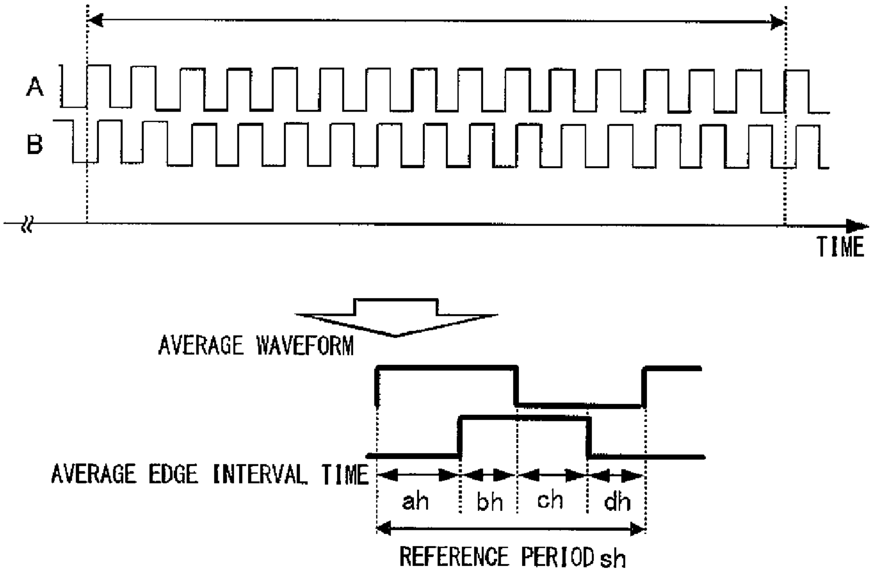
FIG. 11 is a conceptual diagram showing a method for calculating a rotation period according to a second exemplary embodiment.
Figure 12:
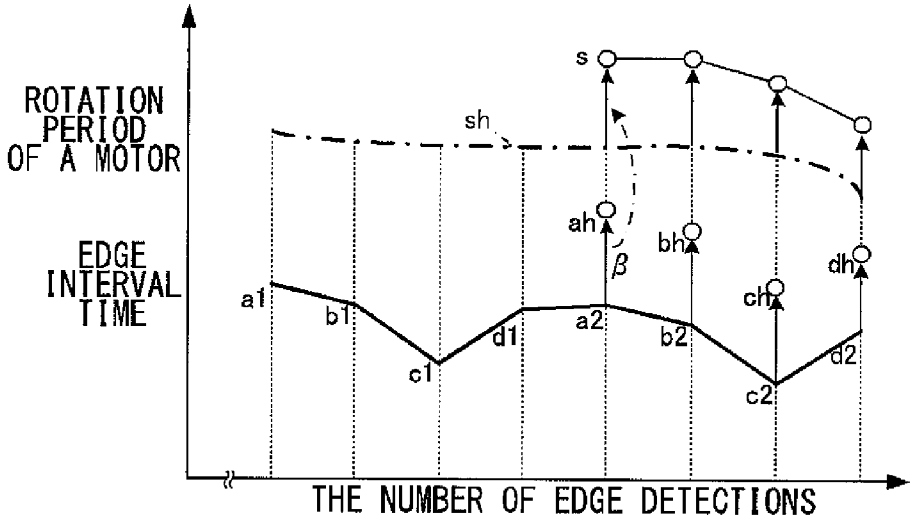
FIG. 12 is a conceptual diagram showing a method for calculating a rotation period according to a second exemplary embodiment.

FIG. 11 and FIG. 12 are each a conceptual diagram showing a method for calculating the rotation period according to the second exemplary embodiment. FIG. 11 illustrates a method for calculating the reference period. FIG. 12 illustrates a relationship between the edge interval time detected for each edge detection and the rotation period of the motor 10.

In the above-described first exemplary embodiment, shown is an example where the rate of change a is calculated in such a manner that the edge interval time calculated at edge detection is compared with the corresponding edge interval time in the phase interval of previous cycle (one rotation of the motor 10 previously). According to this second exemplary embodiment, as shown in FIG. 11, every time the motor 10 rotates, the average value of the edge interval times calculated so far for each phase interval, namely, average edge interval times ah, bh, ch and dh are calculated. Also, the average interval times ah, bh, ch and dh, each of which is the average interval time of each phase interval, are summed up and the average rotation period is calculated. The thus calculated average rotation period is called a reference period sh. Each average edge interval time and the reference period sh are updated for every rotation of the motor 10.

As shown in FIG. 12, the microcomputer 30 calculates a rate of change $\beta$ using the edge interval time and the average edge interval time acquired for each edge detection, multiplies the rate of change $\beta$ by the reference period sh calculated from the average edge interval time, and calculates the current rotation period of the motor 10.

Figure 13:
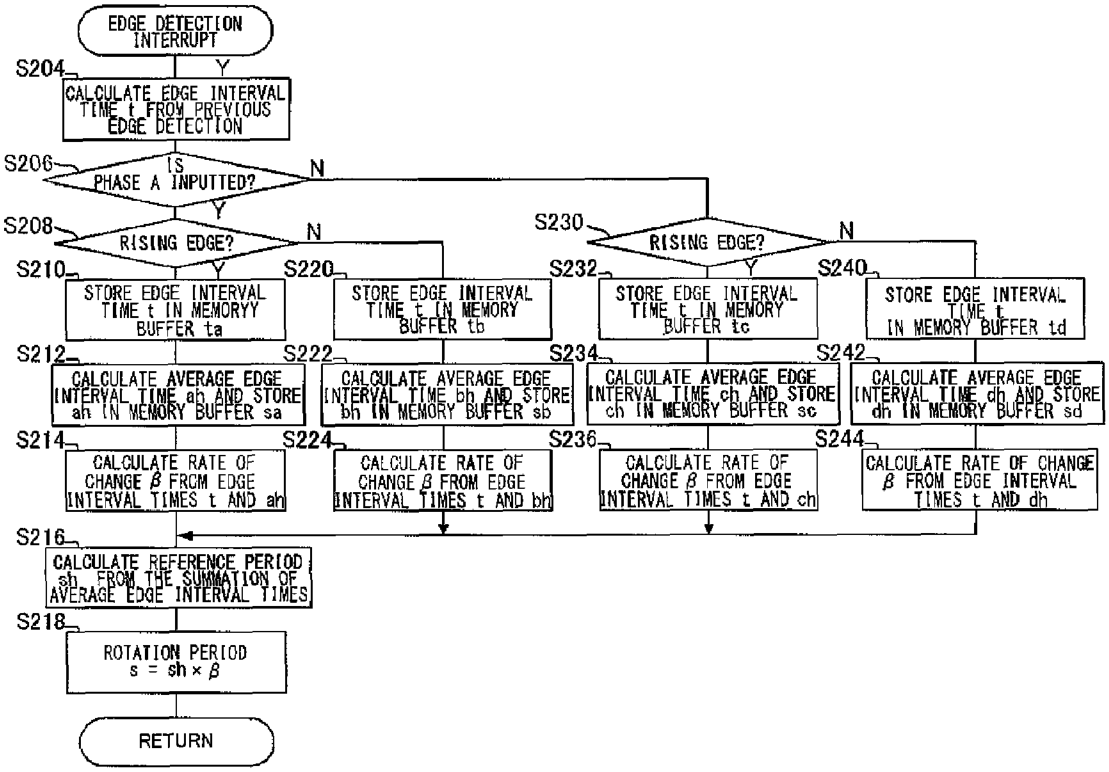
FIG. 13 is a flowchart showing a flow of rotation period calculation processings.

FIG. 13 is a flowchart showing a flow of rotation period calculation processings. After the IG switch 40 is turned on, the microcomputer 30 executes the following processings in parallel with the control of power windows.

When a pulse signal is outputted from the rotation detection sensor 14, the microcomputer 30 executes an edge interrupt routine. That is, when the edge of the pulse signal is detected by the rotation detection sensor 14, the microcomputer 30 calculates the edge interval time t, which is the elapsed time from the previous edge detection, by referring to a timer value (S204).

Then, if the currently detected edge is a rising edge of pulse signal A (Y of S206, Y of S208), the microcomputer 30 stores the currently calculated edge interval time t in a memory buffer ta (S210), calculates an average edge interval time ah, and stores the calculated average edge interval time ah in a memory buffer sa (S212). This memory buffer ta and the other memory buffers described below, namely, tb, tc and td, are structured as queue buffers, such as ring buffers, which are capable of storing edge interval times t of nearest four cycles. The average edge interval time ah is an average value obtained when the sum of the edge interval times t calculated and accumulated until then in the memory buffer a is divided by the number of edges detected. However, since the average edge interval time ah is an average of the edge interval times t of the nearest four edges, ah is not affected by the edge interval times before then as far as the calculation thereof is concerned. The microcomputer 30 calculates the rate of change β (=t/ah) from the currently detected edge interval time t and the average edge interval time ah (S214).

If, on the other hand, the currently detected edge is a falling edge of pulse signal A (Y of S206, N of S208), the microcomputer 30 stores the currently calculated edge interval time t in a memory buffer tb (S220). Then the microcomputer 30 calculates an average edge interval time bh, stores bh in a memory buffer sb (S222), and calculates the rate of change β (=t/bh) from the currently detected edge interval time t and the average edge interval time bh (S224).

If the currently detected edge is a rising edge of pulse signal B (N of S206, Y of S230), the microcomputer 30 stores the currently calculated edge interval time t in a memory buffer tc (S232). Then the microcomputer 30 calculates an average edge interval time ch, stores ch in a memory buffer sc (S234), and calculates the rate of change β (=t/ch) from the currently detected edge interval time t and the average edge interval time ch (S236).

If, on the other hand, the currently detected edge is a falling edge of pulse signal B (N of S206, N of S230), the microcomputer 30 stores the currently calculated edge interval time t in a memory buffer td (S240). Then the microcomputer 30 calculates an average edge interval time dh, stores dh in a memory buffer sd (S242), and calculates the rate of change β (=t/dh) from the currently detected edge interval time t and the average edge interval time dh (S244).

The microcomputer 30 sums up the average edge interval times ah, bh, ch and dh obtained in this manner, and the summation result is now called "reference period sh" (S216). Then the microcomputer 30 multiplies this reference period sh by the rate of change β so as to calculate the current rotation period S (=sh×β) of the motor 10 (S218).

As described above, by employing the second exemplary embodiment, the rotation period of the motor 10 is subdivided by the edge interval times and the rate of change β between the currently calculated edge interval time and the average value of the edge interval times previously calculated for the same phase interval is calculated at each edge detection. That is, this rate of change β also represents a rate of elapsed time of the same phase intervals where the rotation phase of the motor 10 is the same. Hence the rate of change α in the rotation period of the motor 10 can be expressed accurately. As a result, calculation results that respond to the change in the rotation period of the motor 10 with high sensitivity can be obtained. Also, a reference period is calculated every time the edge is detected. Hence, there is no need to invoke a process of calculating the tentative rotation period immediately after the start of rotation of the motor 10 as in the first exemplary embodiment, so that the calculation can be done using the same processing routine from the start of its rotation.

The present invention is not limited to the above-described exemplary embodiments only, and it is understood by those skilled in the art that various modifications such as changes in design may be made based on their knowledge and the exemplary embodiments added with such modifications are also within the scope of the present invention.

In the above exemplary embodiments, an example is shown where the threshold values THS and THN for the output signals of the respective hall elements are set to zero. However, as described in Japanese Patent Application Publication No. 11-107624, their threshold values may be set to a positive or a negative value as appropriate.

In the above exemplary embodiments, the bipolar magnet 22 having one north pole and one south pole is exemplified. However, a magnet with 4 poles, 6 poles, or the like may be used where there are a plurality of north poles and a plurality of south poles and they are successively disposed in the circumferential direction.

In the above exemplary embodiments, a description is given of a case where the power window control apparatus detects the jamming of a foreign object when the door glass 2 is closing, but the power window control apparatus may detect the jamming (entanglement) of a foreign object when the door glass 2 is opening. That is, the jamming of a foreign object in at least either one of the closing and opening of the door glass 2 may be detected based on a drop in the rotation period of the motor 10, or its detection mode may be set in a switchable manner. The method for calculating the rotation period of the motor according to the above exemplary embodiments can be used in at least either one of modes.

In the above exemplary embodiments, the method for calculating the rotation period of the motor is applied to the power window control apparatus. This method is also applicable to any other control apparatus for controlling the drive of a sliding roof of an automobile, an automatic door or shutter, or the like which is driven by a motor while the motor speed is detected by a rotation detection sensor.

While the exemplary embodiments of the present invention and the modifications to the exemplary embodiments have been described using specific terms, such description is for illustrative purposes only, and it is to be understood that changes and variations may still further be made without departing from the spirit or scope of the appended claims.

What is claimed is:

1. A motor characteristics acquiring apparatus for acquiring motor characteristics, the apparatus comprising:

a magnet fixed to a rotating shaft of a motor;

at least one magnetic sensor, disposed around a periphery of the rotating shaft, which outputs a signal when the magnet passes nearby with a rotation of the motor; and an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared, wherein the arithmetic unit calculates the rotation period of the motor by multiplying a predetermined reference period by the calculated rate of change, wherein the arithmetic unit calculates the rotation period of the motor by multiplying the reference period by a rate of change in edge interval times of the same phase interval over a time period of a plurality of rotation periods, wherein the arithmetic unit calculates a tentative rotation period based on an elapsed time, which is the sum total of edge interval times calculated after a start of rotation of the motor at each edge detection during a predetermined time period from the start of rotation of the motor, and the number of edges detected during the elapsed time, wherein the arithmetic unit calculates the rotation period of the motor in such a manner that a tentative rotation period corresponding to each phase interval detected finally during the predetermined time period is used as a tentative reference period at the time of initial edge detection corresponding to each phase interval after the lapse of the predetermined time period, and wherein at each edge detection after the predetermined time period, the arithmetic unit calculates the rotation period of the motor by using the rotation period previously calculated for the same phase interval as the reference period.

2. A motor characteristics acquiring apparatus according to claim 1, wherein the arithmetic unit refers to an acceptable calculation range preset for the rotation period, and when a calculated rotation period falls out of the acceptable calculation range, the arithmetic unit calculates the tentative reference period again without using the rotation period as the next reference period and calculates the rotation period of the motor using the calculated tentative reference period.

3. A motor characteristics acquiring apparatus for acquiring motor characteristics, the apparatus comprising:

a magnet fixed to a rotating shaft of a motor;

at least one magnetic sensor, disposed around a periphery of the rotating shaft, which outputs a signal when the magnet passes nearby with a rotation of the motor; and an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared, wherein the arithmetic unit calculates the rotation period of the motor by multiplying a predetermined reference period by the calculated rate of change, wherein the arithmetic unit calculates the rotation period of the motor by multiplying the reference period by a rate of change in edge interval times of the same phase interval over a time period of a plurality of rotation periods, wherein the arithmetic unit refrains from calculation of the rotation period by taking a predetermined time period after a start of rotation of the motor as a data acquisition duration for calculating the reference period, and calculates a tentative reference period based on the elapsed time of the predetermined time period and the number of edges detected during the elapsed time, wherein at the time of each initial edge detection after the lapse of the predetermined time period, the arithmetic unit calculates the rotation period of the motor using the tentative reference period, and wherein at each edge detection thereafter, the arithmetic unit calculates the rotation period of the motor using the rotation period previously calculated for the same phase interval as the reference period.

4. A motor characteristics acquiring apparatus according to claim 3, wherein the arithmetic unit refers to an acceptable calculation range preset for the rotation period, and when a calculated rotation period falls out of the acceptable calculation range, the arithmetic unit calculates the tentative reference period again without using the rotation period as the next reference period and calculates the rotation period of the motor using the calculated tentative reference period.

5. A motor characteristics acquiring apparatus for acquiring motor characteristics, the apparatus comprising:

a magnet fixed to a rotating shaft of a motor;

at least one magnetic sensor, disposed around a periphery of the rotating shaft, which outputs a signal when the magnet passes nearby with a rotation of the motor; and an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared, wherein the arithmetic unit calculates the rotation period of the motor by multiplying a predetermined reference period by the calculated rate of change, wherein the arithmetic unit calculates the rotation period of the motor by multiplying the reference period by a rate of change in edge interval times of the same phase interval over a time period of a plurality of rotation periods, wherein, the arithmetic unit stores the edge interval time during a predetermined time period for every phase interval successively, and the arithmetic unit calculates an average edge interval time, which is an average value of edge interval times for the same phase interval, at each edge detection, and calculates the rotation period of the motor in such a manner that the rate of change between the edge interval time calculated at an edge detection and the average edge interval time is calculated, and the calculated rate of change is multiplied by the reference period, wherein at each edge detection, the arithmetic unit acquires a tentative reference period from the sum total of average edge intervals calculated for successive phase intervals of one cycle, and use the tentative reference period as the reference period.

6. A motor characteristics acquiring apparatus according to claim 5, wherein the arithmetic unit refers to an acceptable calculation range preset for the rotation period, and when a calculated rotation period falls out of the acceptable calculation range, the arithmetic unit calculates the tentative reference period again without using the rotation period as the next reference period and calculates the rotation period of the motor using the calculated tentative reference period.

7. A power window control apparatus for opening and closing a door glass of a vehicle by driving a regulator and controlling the rotation of a motor, the apparatus comprising:

a magnet fixed to a rotating shaft of a motor;

at least one magnetic sensor, disposed around a periphery of the rotating shaft, which outputs a signal when the magnet passes nearby with a rotation of the motor;

an arithmetic unit which calculates a rate of change in rotation period in a manner such that edges of the signal outputted from the magnetic sensor are detected, edge interval times each of which is an interval between temporally closest edges successively outputted from the magnetic sensor are calculated successively and stored, and corresponding edge interval times in a plurality of rotation periods of the motor are compared, which acquires the rotation period of the motor by multiplying a preset reference rotation by the rate of change, and which calculates a rotational speed thereof from the rotation period; and a control unit which controls the rotation of the motor by shifting to a preset control mode according to the rotational speed of the motor.

* * * * *